(12) United States Patent
Hoffman

(10) Patent No.: US 7,338,550 B2
(45) Date of Patent: Mar. 4, 2008

(54) AXLE ASSEMBLY WITH PURGE RESERVOIR FOR AIR DRYER

(75) Inventor: Ricardo Hoffman, Greensboro, NC (US)

(73) Assignee: ArvinMeritor Technology, LLC, Troy, MI (US)

(*) Notice: Subject to any disclaimer, the term of this patent is extended or adjusted under 35 U.S.C. 154(b) by 385 days.

(21) Appl. No.: 11/195,513

(22) Filed: Aug. 2, 2005

(65) Prior Publication Data
US 2007/0028776 A1  Feb. 8, 2007

(51) Int. Cl.
*B01D 53/02* (2006.01)

(52) U.S. Cl. .................... 95/148; 96/108; 55/385.2; 55/DIG. 17

(58) Field of Classification Search .......... 96/108, 96/113, 114; 55/385.2, DIG. 17; 95/117, 95/148; 280/124.1–124.179
See application file for complete search history.

(56) References Cited

U.S. PATENT DOCUMENTS

| | | | |
|---|---|---|---|
| 2,914,339 A | 11/1959 | Goirand | |
| 3,828,881 A * | 8/1974 | Owen | 180/339 |
| 4,081,050 A | 3/1978 | Hennessey | |
| 4,143,735 A | 3/1979 | Schlanger | |
| 4,206,934 A | 6/1980 | McKee | |
| 4,213,625 A | 7/1980 | Hagen | |
| 4,321,977 A | 3/1982 | Tenn | |
| 4,664,407 A | 5/1987 | Griffin | |
| 4,856,812 A | 8/1989 | Stephens | |
| 4,964,679 A | 10/1990 | Rath | |
| RE33,630 E | 7/1991 | Griffin | |
| 5,046,752 A | 9/1991 | Stephens | |
| 5,172,958 A | 12/1992 | Sell | |
| 5,240,312 A | 8/1993 | Burckhardt | |
| 5,367,861 A | 11/1994 | Murakawa | |
| 5,429,167 A | 7/1995 | Jensen | |
| 5,575,541 A * | 11/1996 | Elamin | 303/1 |
| 5,917,139 A | 6/1999 | Goodell | |
| 6,007,073 A | 12/1999 | Gunter | |
| 6,074,462 A | 6/2000 | Quinn | |
| 6,120,107 A | 9/2000 | Eslinger | |
| 6,398,236 B1 | 6/2002 | Richardson | |
| 6,513,820 B2 | 2/2003 | Schoop | |
| 6,536,749 B1 | 3/2003 | Luhmann | |
| 6,585,806 B2 | 7/2003 | Quinn | |
| 6,746,031 B2 | 6/2004 | Carlstedt | |
| 2002/0189456 A1 * | 12/2002 | Hoffman et al. | 96/110 |

FOREIGN PATENT DOCUMENTS

| | | |
|---|---|---|
| DE | 19503454 | 8/1996 |
| FR | 2678867 | 1/1993 |
| FR | 2755065 | 4/1998 |

* cited by examiner

*Primary Examiner*—Frank M. Lawrence
(74) *Attorney, Agent, or Firm*—Carlson, Gaskey & Olds

(57) ABSTRACT

An axle assembly includes an axle beam with an inner cavity that forms a purge reservoir. The purge reservoir is fluidly connected to an air dryer with a purge valve. The air dryer is part of a vehicle air supply system that supplies air from a compressor to storage reservoirs for vehicle systems such as suspension and braking systems. The air dryer includes a desiccant material that removes moisture from compressed air. During a compression cycle, air flows through the air dryer to the storage reservoirs and to the purge reservoir. Once a desired pressure level in the storage reservoirs is achieved, the compressor is unloaded and a purge command is generated to open the purge valve. When the purge valve is opened, air stored within the purge reservoir flows back through the air dryer to regenerate the desiccant material.

20 Claims, 2 Drawing Sheets

AXLE ASSEMBLY WITH PURGE RESERVOIR FOR AIR DRYER

TECHNICAL FIELD

The subject invention relates to an axle assembly that includes a pneumatically sealed inner cavity that forms a purge reservoir for an air dryer.

BACKGROUND OF THE INVENTION

Vehicle air supply systems include an air dryer that receives air from a compressor and supplies air to supply reservoirs for vehicle operating systems. The air dryer includes materials that remove moisture and particulates from the air prior to supplying the air to the supply reservoirs. The supply reservoirs supply air to vehicle operating systems such as suspension and brake systems. Clean, dry air is needed to reduce component wear and to maintain system operating efficiencies.

In one known configuration, the air dryer includes a desiccant material that removes moisture from air supplied by the compressor. During a compression cycle, air flows through the desiccant material to the supply reservoirs until a desired pressure level is achieved. Once the desired pressure level is achieved, the compressor is unloaded. During unloading, the desiccant material is regenerated by purging. Air held within a purge reservoir is used to regenerate the desiccant material.

Traditionally, the purge reservoir is internally formed within the air dryer. However, some vehicle air supply systems require a separate purge reservoir. To accommodate these systems, a separate tank is installed on a vehicle to provide the separate purge reservoir. One disadvantage with using a separate tank is that in addition to another tank, additional fluid connections are required, both of which increase assembly time and cost. Further, the separate tank and additional fluid connections increase weight, which adversely affects fuel economy.

Another disadvantage is that the separate tank is mounted to a vehicle frame member, which takes up packaging space that would otherwise be useful for other vehicle systems. Further, various mounting configurations and/or hardware are required to attach the separate tank to different vehicle frame configurations. This proliferates parts, increases cost, and increases assembly time.

Thus, there is a need for a vehicle air supply system that includes a separate purge reservoir for an air dryer, but which does not require a separate tank.

SUMMARY OF THE INVENTION

An axle assembly includes an axle beam that extends between laterally spaced wheel components. The axle beam includes an inner cavity that forms a purge reservoir for an air dryer. The axle beam includes an inlet port that is fluidly connected to a purge valve. During a compression cycle the purge reservoir is filled, and during a purge cycle air is exhausted from the purge reservoir, through the air dryer, to atmosphere.

The air dryer is part of a vehicle air supply system that supplies air from a compressor to supply reservoirs that are used to store air for operating vehicle systems such as brake systems or suspension systems, for example. The air dryer includes a desiccant material that removes moisture from the air before the air is transferred to the supply reservoirs. During the compression cycle, air flows through the desiccant material to fill the purge reservoirs and supply reservoirs. The compression cycle continues until a desired pressure level is achieved. Once this level is achieved, the compressor is unloaded and the purge cycle is initiated.

In response to a purge command, the purge valve is opened and air from the purge reservoir in the axle beam flows back through the air dryer to regenerate the desiccant material. This air is purged to atmosphere and the purge reservoir is re-filled during the next compression cycle.

By using a purge reservoir formed within an axle beam, the need for a separate purge reservoir tank is eliminated. By eliminating the separate purge reservoir tank, weight is decreased, more packaging space is available for other vehicle components, and mounting hardware for the separate purge reservoir tank is eliminated because the purge reservoir is mounted to the vehicle as part of the axle assembly.

These and other features of the present invention can be best understood from the following specification and drawings, the following of which is a brief description.

DETAILED DESCRIPTION OF THE PREFERRED EMBODIMENT

Figure 1:
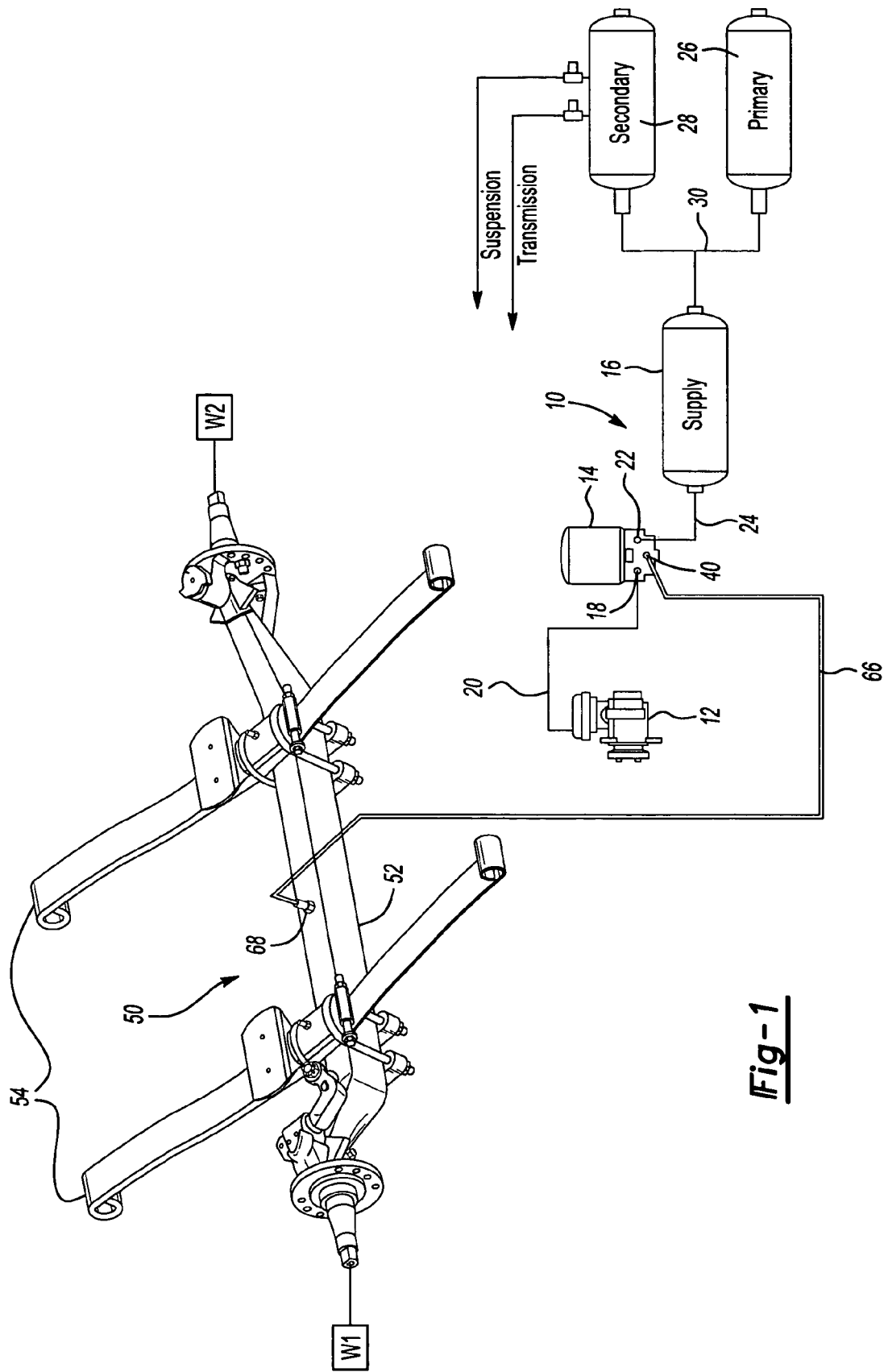
FIG. 1 shows a schematic view of a vehicle air supply system coupled to an axle assembly incorporating the subject invention.

A vehicle air supply system is shown generally at 10 in FIG. 1. The vehicle air supply system 10 includes a compressor 12, an air dryer 14, and a main supply reservoir 16. During a compression cycle, the compressor 12 supplies air to an inlet 18 of the air dryer 14 via a fluid connection 20. Air flows out of an outlet 22 of the air dryer 14 to the main supply reservoir 16 via another fluid connection 24. The air dryer 14 includes a desiccant material (not shown) that removes moisture from air supplied by the compressor 12 during the compression cycle prior to supplying air to the main supply reservoir 16 as known.

In the example shown, the main supply reservoir 16 provides air to a primary air reservoir 26 and a secondary air reservoir 28 via a fluid connection assembly 30. The primary 26 and secondary 28 air reservoirs supply air to control vehicle operating systems such as brake and suspension systems, for example. It should be understood that the fluid connections 20, 24 and the fluid connection assembly 30, are just one example configuration of the vehicle air supply system 10. Other configurations with additional fluid connections or with fewer fluid connections could also utilize the subject invention, which is described in detail below. Further, the configuration using the main supply reservoir 16 with primary 26 and secondary 28 reservoirs is just one example of a reservoir configuration that can be used with the subject invention. Other reservoir configurations with fewer reservoirs or additional reservoirs could also utilize the subject invention.

The compressor cycle continues until a desired pressure level is achieved. Pressure sensors (not shown), a mechanical governor (not shown), or other similar mechanisms could be used to set and/or identify the desired pressure level. Once this desired pressure level is achieved a control valve (not shown) is actuated to send a signal to unload the compressor 12. Additionally, the control valve sends a purge signal to purge the air dryer 14. Any type of control valve or control mechanism could be used to signal unloading and purging, including a solenoid, governor, and/or any combination of mechanical and electrical valves. The air dryer 14 includes a purge valve 40 that opens in response to the purge signal.

An axle assembly 50 includes an axle housing or axle beam 52 that extends between laterally spaced wheel components W1, W2. The axle assembly 50 is connected to a vehicle frame (not shown) with a suspension assembly 54 as known. The axle assembly 50 includes a purge reservoir 56, shown in FIG. 2, which is formed within an inner cavity of the axle beam 52.

In the example shown, the axle assembly 50 is a non-drive steer axle that includes a pneumatically sealed hollow tube as a main structural member. However, it should be understood that other axle configurations including drive, non-drive, steer, and rigid configurations could also utilize inner cavities for a purge reservoir.

Figure 2:
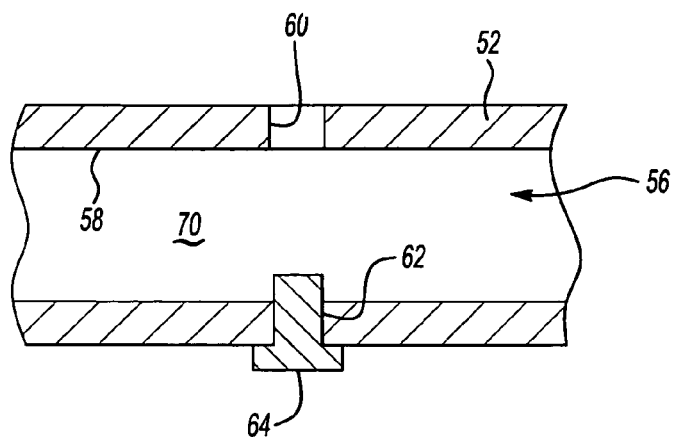
FIG. 2 is a schematic cross-sectional view of one embodiment of an axle beam incorporating the subject invention.

As shown in FIG. 2, the axle beam 52 includes an inner surface 58 that defines at least a portion of the purge reservoir 56. The axle beam 52 also includes an inlet port 60, which is fluidly connected to the purge valve 40, and a drain port 62. Any liquid that may get inside of the axle beam 52 due to condensation or an improperly working air dryer 14, can easily be drained from the axle beam 52 through the drain port 62. A plug 64 or other similar mechanism is used to close off the drain port 62 during normal vehicle operation.

A fluid connection 66 (FIG. 1) extends between the purge valve 40 and the inlet port 60. A fitting 68 or other similar mechanism provides a sealed connection between the axle beam 52 and the fluid connection 66 at the inlet port 60.

During each compression cycle, air flows from the air dryer 14 to fill the purge reservoir 56. Each time the compressor 12 is unloaded and the purge valve 40 is opened, the purge reservoir 56 is exhausted back through the fluid connection 66 to the air dryer 14 to regenerate the desiccant material. This air is then exhausted to atmosphere. The purge reservoir 56 is then re-filled during the next compression cycle.

In the example shown in FIG. 2, the purge reservoir 56 is a pneumatically sealed inner cavity 70 that has a predetermined fluid volume defined by the size of the axle beam 52. The bulk of the fluid volume is exhausted to atmosphere through the air dryer 14 during each purge cycle. Often, this fluid volume in such an axle configuration holds more air than is needed to perform a purge cycle. As most of the air is exhausted during a purge cycle, and must subsequently be re-filled during the compression cycle, the compressor 12 could be operating longer than is necessary.

Figure 3:
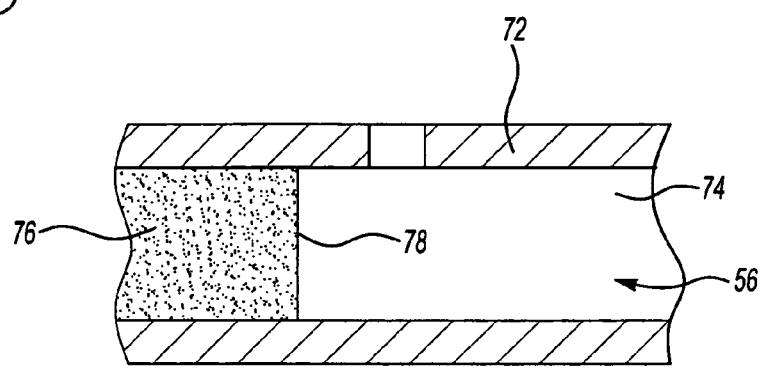
FIG. 3 is a schematic cross-sectional view of another embodiment of an axle beam incorporating the subject invention.
Figure 4:
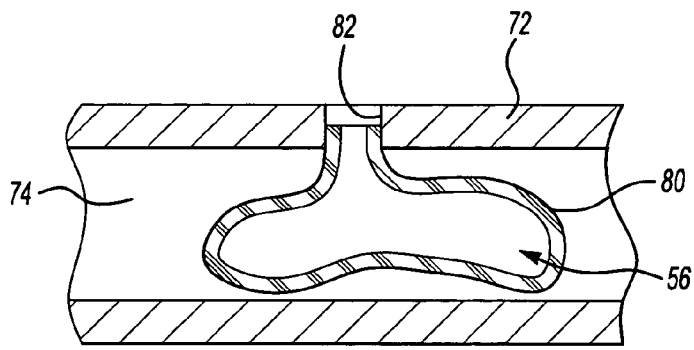
FIG. 4 is a schematic cross-sectional view of another embodiment of an axle beam incorporating the subject invention.

In the examples shown in FIGS. 3 and 4, an axle beam 72 includes volume reducing materials or components that are installed within an inner cavity 74 formed in the axle beam 72. FIG. 3 shows a lightweight material 76 that at least partially fills a portion of the inner cavity 74 to reduce the overall volume. Any type of lightweight filling material could be used. The lightweight material 76 would include a sealing barrier 78 such that a remaining cavity portion, which forms the purge reservoir 56, would be sealed.

FIG. 4 shows an air bladder 80 that is installed within the inner cavity 74. The air bladder 80 can be formed from any resilient material and is sealed at an inlet port 82 to the axle beam 72.

Figure 5:
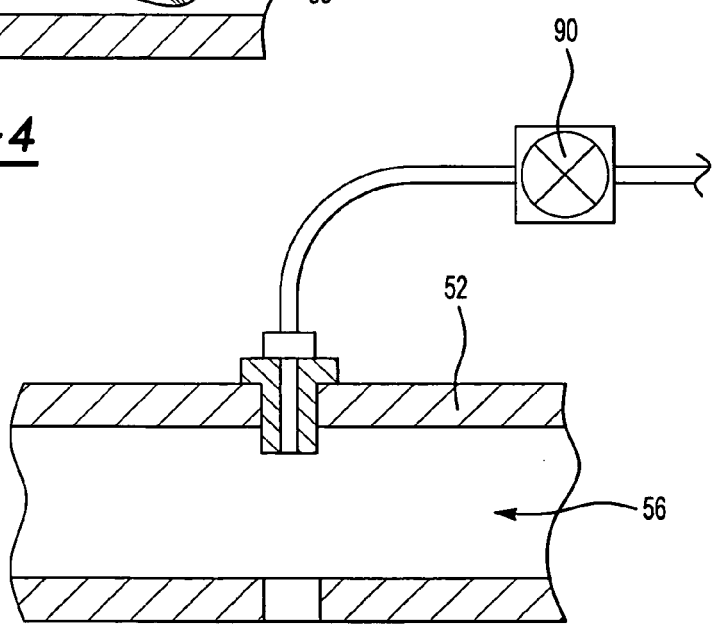
FIG. 5 is a schematic cross-sectional view of another embodiment of an axle beam incorporating the subject invention.

In another example shown in FIG. 5, the purge reservoir 56 is formed from the entire fluid volume of the axle beam 52 and does not include any volume reducing materials or components. Instead, a control valve 90 is in fluid communication with the purge reservoir 56. The control valve 90 is positioned upstream from the purge reservoir 56 and downstream from the purge valve 40. The control valve 90 exhausts air from the purge reservoir 56 to a predetermined pressure level during each purge cycle instead of being fully exhausted to atmospheric pressure. Any type of control valve could be used.

Each of configurations shown in FIGS. 1-5 shows the unique feature of forming a purge reservoir in an axle beam. By forming the purge reservoir within the axle beam, the need for a separate purge reservoir tank is eliminated. This reduces weight, makes more packaging space available for other vehicle components, and eliminates mounting hardware that would otherwise be need to mount the separate purge reservoir tank.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle air supply system comprising:
   an air dryer including a purge valve; and
   an axle component including a purge reservoir wherein air from said purge reservoir is communicated to said air dryer via said purge valve in response to a purge command.

2. The vehicle air supply system according to claim 1 wherein said axle component comprises an axle beam.

3. The vehicle air supply system according to claim 2 wherein said axle beam includes a pneumatically sealed inner cavity that forms said purge reservoir.

4. The vehicle air supply system according to claim 2 wherein said axle beam comprises a hollow tube extending between laterally spaced wheel components, said hollow tube having an inner surface defining said purge reservoir.

5. The vehicle air supply system according to claim 1 wherein said air dryer includes an inlet adapted for fluid connection to a compressor and at least one outlet adapted for fluid connection to at least one air supply reservoir.

6. The vehicle air supply system according to claim 5 wherein the compressor supplies air to said air dryer through said inlet during a compression cycle and wherein said air dryer supplies air to the at least one air supply reservoir through the at least one outlet during the compression cycle until a desired pressure level is achieved in the at least one air supply reservoir.

7. The vehicle air supply system according to claim 6 wherein a compressor unloading cycle is initiated when the desired pressure level is achieved and wherein the purge command is generated during the compressor unloading cycle to open said purge valve.

8. The vehicle air supply system according to claim 7 wherein said purge reservoir is filled with air from said air dryer during each compression cycle and is exhausted through said air dryer to atmosphere during each compressor unloading cycle.

9. An axle assembly comprising:
   an axle beam extending between laterally spaced wheel components; and
   a purge reservoir formed within said axle beam wherein air is stored in said purge reservoir and is in fluid communication with an air dryer during a purge cycle.

10. The axle assembly according to claim 9 wherein said axle beam comprises an axle housing having an inner cavity that forms said purge reservoir.

11. The axle assembly according to claim 10 wherein said inner cavity comprises a pneumatically sealed inner cavity that defines a fluid volume and wherein all of the fluid volume is exhausted to atmosphere through the air dryer during each purge cycle.

12. The axle assembly according to claim 10 wherein said inner cavity defines a first fluid volume and wherein said axle beam includes at least one volume reducing component received within said inner cavity to form a pneumatically sealed cavity defining a second fluid volume that is less than said first fluid volume and wherein said second fluid volume is exhausted to atmosphere through the air dryer during each purge cycle.

13. The axle assembly according to claim 12 where said at least one volume reducing component comprises a resilient bladder.

14. The axle assembly according to claim 12 wherein said at least one volume reducing component comprises a lightweight material that at least partially fills said inner cavity to reduce said first fluid volume to said second fluid volume.

15. The axle assembly according to claim 10 wherein said inner cavity comprises a pneumatically sealed inner cavity that defines a fluid volume and including a control valve in fluid communication with said fluid volume and positioned upstream from said pneumatically sealed inner cavity and downstream from an air dryer purge valve and wherein said control valve exhausts said fluid volume to a predetermined pressure level during each purge cycle, said predetermined pressure level being different than atmospheric pressure.

16. The axle assembly according to claim 9 including at least one fluid connection fluidly connecting said purge reservoir to a purge valve that is in fluid communication with the air dryer and wherein air is supplied to said purge reservoir through said purge valve during a compression cycle and wherein air is exhausted from said purge reservoir through said purge valve to atmosphere during each purge cycle.

17. The axle assembly according to claim 16 wherein said axle beam includes an inlet port fluidly connected to said at least one fluid connection and a drain port that allows liquid to be drained from said purge reservoir.

18. The axle assembly according to claim 9 wherein the axle assembly comprises a non-drive steer axle.

19. A method for purging air from an air dryer comprising:
   (a) generating a purge command; and
   (b) exhausting air from a purge reservoir formed within an axle beam through the air dryer in response to the purge command.

20. The method according to claim 19 including providing the axle beam with a pneumatically sealed inner cavity to form the purge reservoir, providing at least one inlet port in the axle beam, and fluidly connecting the at least one inlet port to a purge valve supported by the air dryer.

* * * * *